United States Patent
Stocchiero

(10) Patent No.: US 6,383,681 B1
(45) Date of Patent: May 7, 2002

(54) SEAL ASSEMBLY FOR A BATTERY TERMINAL

(76) Inventor: Olimpio Stocchiero, Via Kennedy, 5-36050 Montorso Vicentino (VI) (IT)

(*) Notice: Subject to any disclaimer, the term of this patent is extended or adjusted under 35 U.S.C. 154(b) by 0 days.

(21) Appl. No.: 09/402,083

(22) PCT Filed: Mar. 31, 1998

(86) PCT No.: PCT/EP98/01873

§ 371 Date: Sep. 29, 1999

§ 102(e) Date: Sep. 29, 1999

(87) PCT Pub. No.: WO98/44575

PCT Pub. Date: Oct. 8, 1998

(30) Foreign Application Priority Data

Apr. 1, 1997 (IT) .......................................... 97A000051

(51) Int. Cl.⁷ ............................ H01M 2/06; H01M 2/30
(52) U.S. Cl. ........................................ 429/180; 429/181
(58) Field of Search ................................. 429/180, 181, 429/182, 183, 184

(56) References Cited

U.S. PATENT DOCUMENTS 4,164,609 A  8/1979  Jensen ........................ 429/183
4,683,647 A * 8/1987  Brecht et al. ........... 429/181 X
4,775,604 A * 10/1988  Dougherty et al. ......... 429/178

FOREIGN PATENT DOCUMENTS

| DE | 3035655 A1 * | 5/1982 |
| DE | 86 00 312 | 8/1986 |
| EP | 0 228 503 | 7/1987 |
| WO | 90 05999 | 5/1990 |
| WO | 94 13023 | 6/1994 |
| WO | 95 22178 | 8/1995 |

* cited by examiner

Primary Examiner—Gabrielle Brouillette
Assistant Examiner—Jonathan Creapeau
(74) Attorney, Agent, or Firm—Dykema Gossett PLLC

(57) ABSTRACT

The invention realizes an improved sealing unit for the electrolyte of electric batteries which includes a container which is closed through a cover. The cover is provided with annular elements circumscribing the holes which let the poles pass by and be coupled to the elements which are housed in the container. The sealing unit includes a tubular ring nut which is coupled in the interspace existing between the pole and the hole, and which cooperates with at least a first sealing gasket. The first sealing gasket is included between the pole, the cover and the ring nut, and realizes with them an annular sealing area.

19 Claims, 2 Drawing Sheets

SEAL ASSEMBLY FOR A BATTERY TERMINAL

BACKGROUND OF THE INVENTION

The invention concerns an improved sealing unit for electric batteries, which is particularly fit for preventing the blow-by of the electrolyte.

As it Is known in the electric batteries the poles to which the external electric connections are connected, project from the cover, said poles being placed through the inside of holes which are made in the same cover.

According to an embodiment of a known type which is shown in FIG. 1 in the enclosed drawings and relating to a pole of an improved type which is described in the Italian application VI94A000023 and in the corresponding PCT/EP95/00530 in the name of the same applicant of the present invention, the locking of each pole A in the respective hole B occurs through a tubular ring nut C which is placed in the interspace between the hole B and the pole A. Said tubular ring nut C locks them reciprocally through the interference which it realizes forcing an annular shoulder D. Said annular shoulder D is realized in the pole A against a corresponding shoulder E which is realized in the cover F, opposed to said shoulder E and projecting towards the inside of the hole B which is realized in the cover.

In order to realize the seal, a gasket G is placed between said shoulders whereas a further gasket H, housed in an annular housing I which is realized in the ring nut C, is placed between said ring nut C and the wall of the hole B.

It can be observed that each gasket realizes the seal against two opposed surfaces. Said opposed surfaces, as regards the gasket which is housed between said shoulders, are composed by two annular opposed and coaxial surfaces, one belonging to the pole and the other belonging to the cover whereas, as regards the gasket which is housed in the ring nut, said annular surfaces are composed by two annular concentric surfaces, one belonging to the lateral surface of the hole and the other belonging to the bottom surface of the annular housing which is realized in the ring nut.

Other realizations in which the gaskets are more than two and are placed in different positions, as regards those which have been described, are also known, but all of them present the peculiarity that the seal is realized always on two opposed surfaces, one belonging to the pole and the other to the cover, or one belonging to the ring nut and the other to the cover hole in which said ring nut is coupled, or also one belonging to the pole and the other to the ring nut.

In any case, moreover, the seal is assured by the shrinking through which said tubular ring nut, or a mechanically equivalent element, forces reciprocally said pole and said cover.

It has been found out that the seals which are realized this way do not always assure an adequate protection to the electric battery against the electrolyte outlet and that is the reason why the present invention is realized. Its aim is to improve, in the electric batteries, the seal against the electrolyte blow-by along the lateral surface of the poles.

SUMMARY OF THE INVENTION

The said object is attained through the realization of an improved sealing unit for the electrolyte of electric batteries, said electric batteries including a container which is closed by means of a cover. Said cover is provided with annular elements circumscribing the holes which let the poles pass by and be coupled to the elements which are housed in said container. Said sealing unit, according to the main claim, includes a tubular ring nut which is coupled in the interspace existing between said pole and said hole, in which said pole is inserted and cooperating with at least a first sealing gasket, and wherein said at least first sealing gasket is included between said pole, said cover and said ring nut, and realizes with them an annular sealing area preventing the electrolyte blow-by along the lateral surface of said poles, when said ring nut clamps said pole to said cover.

According to a preferred embodiment, said at least first gasket is composed by a gasket of the OR type which is housed in an annular housing, which is coaxial to said pole, presenting a triangular cross sectional shape being circumscribed by:

the plain surface of an annular shoulder belonging to said cover and projecting radially towards the inside of said hole;

the lateral surface of a depressed diameter area of said pole;

the annular plain surface of a bevel which is realized at the end of said ring nut.

Connected with each said surface, said first gasket realizes an annular sealing surface so that three annular sealing surfaces are defined as a whole, one of which is connected with the ring nut, the other connected with the cover and still another connected with the pole.

Said ring nut presents in an intermediate position a conical annular surface which is coupled against a corresponding conical annular surface which is made in the pole. The axial position of said conical annular surfaces, when the ring nut is coupled to the pole, determines the interference degree through which said gasket forces said three surfaces wherewith it is in contact in order to realize the seal.

Advantageously the contact of said first gasket with all the three surfaces belonging to the cover at the same time, one to the pole and the other to the ring nut, determines a larger sealing degree which, as regards to the seals of a known type, is more reliable in order to prevent the electrolyte blow-by towards the outside of the electric battery. Still advantageously the seal of said first gasket can be completed by assembling further gaskets of the previously described type too.

BRIEF DESCRIPTION OF THE DRAWINGS

The said object and advantages will be better pointed out during the description of a preferred embodiment of the invention which is given approximately but not restrictively and which is shown in the enclosed drawings where.

DESCRIPTION OF THE INVENTION

Figure 2:
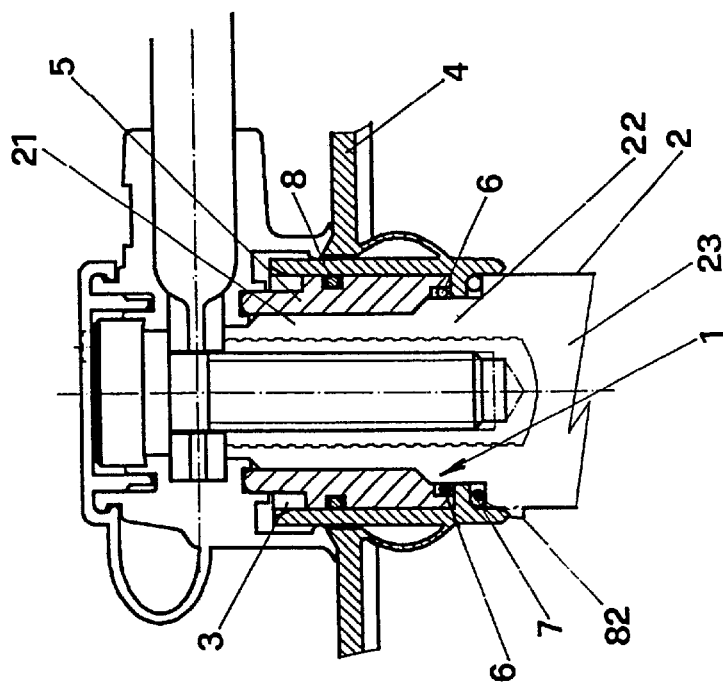
FIG. 2 shows the improved sealing unit which is the subject of the invention.
Figure 3:
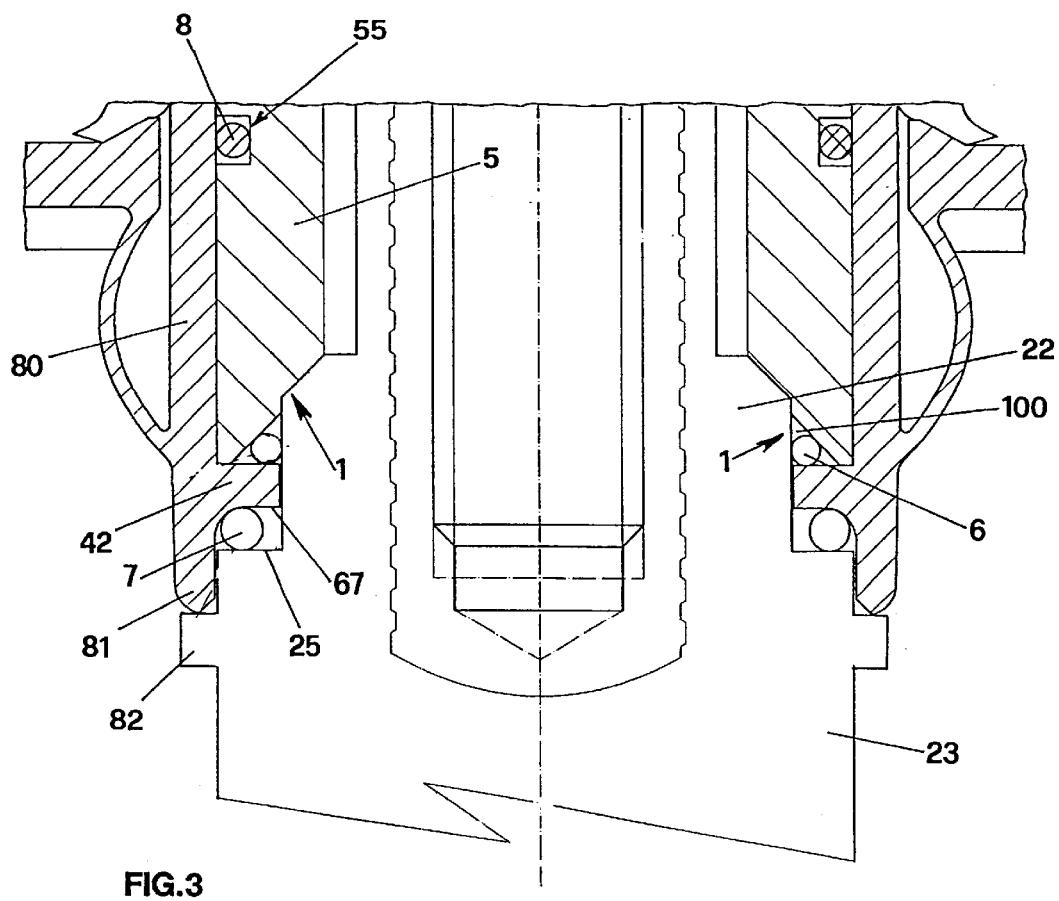
FIG. 3 shows an enlarged representation of the improved sealing unit of the invention, seen from the sealing area.
Figure 4:
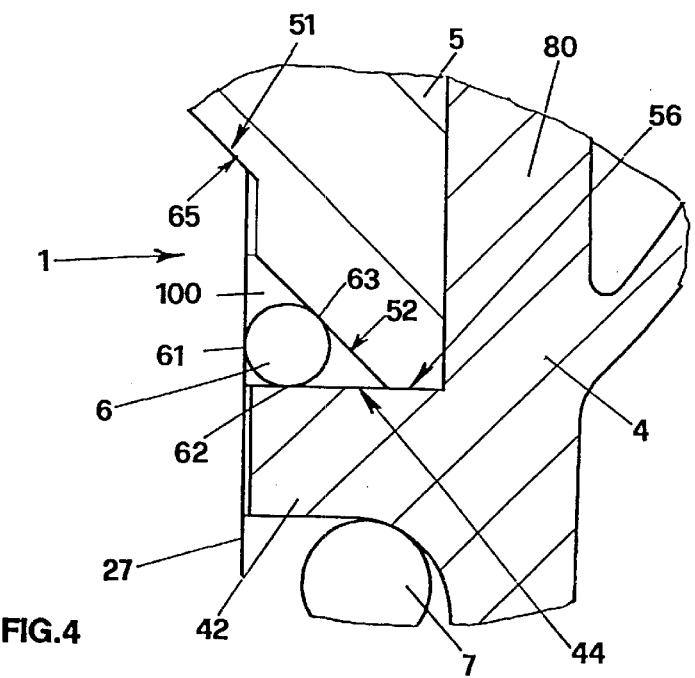
FIG. 4 shows an enlargement of a detail of FIG. 4 representation.

As it can be observed in FIG. 2 and more in detail in FIGS. 3 and 4, the improved sealing unit of the invention, referred to 1 as a whole, is applied to a pole 2, belonging to an electric battery which is not represented in figure, which is coupled in a hole 3 belonging to a closing cover 4 of the container wherein the elements composing the electric battery are contained.

Figure 1:
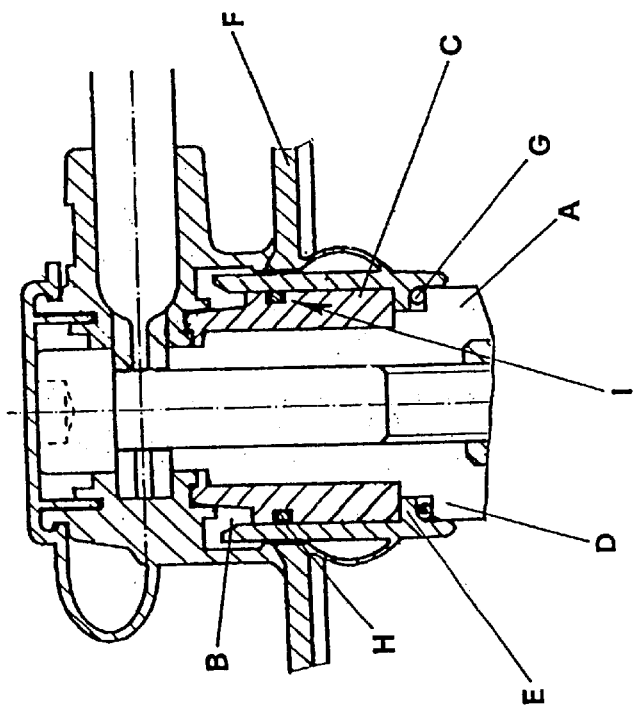
FIG. 1 shows an embodiment of the sealing devices belonging to the known techniques.

Said improved unit of FIG. 1, as it can be observed, is composed by a ring nut 5 which is fastened to said pole 2 connected with its terminal area 21 and which is placed inside the interspace existing between the pole two and the hole 3 wherein said pole is inserted.

The sealing unit, in addition to the tubular ring nut 5, includes also a gasket 6 of the OR type, which is visible in larger detail in FIGS. 3 and 4. Said gasket 6, as it can be observed, realizes:

a first sealing annular area 61 against the lateral surface 27 of the pole 2;

a second sealing annular zone 62 against the plane annular surface 44 of an annular shoulder 42 of said cover 4, projecting radially towards the inside of said hole 3 which is made in the same cover 4;

a third sealing annular area 63 which is realized against the plane annular surface 52 of a bevel which is realized at the end of the same ring nut 5. Said surfaces 27, 44 and 52, by means of a reciprocal intersection, define an annular housing with a triangular transversal outline 100, in which the gasket 6 is housed.

It can also be observed that said ring nut 5 is provided in a intermediate position with a conical annular surface 51 cooperating with a corresponding opposed conical annular surface 65 belonging to the pole 2 and realized in its intermediate area 22. The reciprocal position of said conical annular surfaces 51 and 65 is such that it determines the seal against the acid blow-by and the compression ratio wherethrough said first gasket 6 interferes against the respective sealing areas 61, 62 and 63 in order to realize the seal, when the ring nut 5 clamps said pole 2 to said cover 4.

Moreover it can be observed that the ring nut 5 too presents the annular surface 56, which is realized at its end, striking the plane annular surface 44 of said cover. So it is realized a further mechanic contact assuring, together with the mechanic contact which is realized between the conical annular surfaces 51 and 65 reciprocally cooperating, the seal maintenance against the electrolyte blow-by even when the absence or the damage of the gasket 6 are such that it cannot assure the seal.

Preferably the ring nut 5 and the terminal area 21 of the pole are threaded so that they realize reciprocally a screw coupling; however their coupling could occur through different systems too, for example a pressure one. In order to improve the total sealing effect of said first gasket 6, a second gasket 7 is housed between a radial shoulder 25 which is realized in the pole 2 connected with the plane dividing the larger diameter area 23 from the intermediate diameter area 22, and with the corresponding surface 67 of shoulder 42 of said cover 4.

Moreover the lower end 81 of the annular element 80 circumscribing the hole 3 wherein the pole 2 is inserted, strikes an annular projection 82 which is made in the area 23 whose diameter is larger than the same pole 2. In this way the compression ratio and therefore the entity of the gaskets 6 and 7 seal is determined by the relative position between the ring nut 5 and the annular element 80 as regards the pole 2. Said position is defined by the contrast respectively between the conical annular surface 65 of the pole and the annular element 80 end 81 as regards the annular shoulder 82 of the pole.

In order to improve further the total sealing effect, a third gasket 8 is placed inside an annular housing 55 which is realized in the ring nut 5. Said gasket 8 s realizes the seal against the lateral surface of the hole 3 which is defined by the annular element 80 wherein the tubular bush 5 is inserted.

The presence of the mechanic contacts between the surfaces 51 and 65, 56 and 44, 81 and 82, assures the seal even if one of the gasket 6 or 7 is damaged or however even if said gasket 6 and 7 cannot assure the seal against the electrolyte blow-by.

According to what has been described it can be understood therefore that the improved sealing unit which is the subject of the invention gives a better assurance against the blow-by of the electrolyte which is external to the battery.

It will also be possible in an executive phase to pair the improved sealing unit to the use of further sealing means of a different type as to those which have been described.

What is claimed is:

1. A sealing unit for electrolyte in electric batteries, said electric batteries including a container closed by a cover including an upstanding annular element formed with a planar upwardly facing annular surface circumscribing a hole formed in the cover for receiving a pole therethrough and forming an interspace therebetween, said sealing unit including a tubular ring nut secured in the interspace, at least a first sealing gasket cooperating with the ring nut, wherein said at least first sealing gasket is located between said pole, said cover and said ring nut forming three annular sealing surfaces for sealing the pole, the annular surface, and the ring nut respectively, and wherein said ring nut includes an intermediate annular conical surface and the pole hag a corresponding annular surface in opposition to the intermediate conical surface for engaging the ring nut and defining a degree of interference therebetween to assure a seal against blow-by of electrolyte from the battery.

2. A sealing unit according to claim 1, wherein said pole is formed with a lateral cylindrical surface, and said ring nut is formed with a beveled surface, said annular surface, said lateral cylindrical surface and said bevel define a triangular annular opening for receiving the at least first gasket.

3. A sealing unit according to claim 1, wherein said ring nut includes an annular surface at an end for contacting the plane annular surface to thereby seal against blow-by of electrolyte.

4. A sealing unit according to claim 1, wherein said pole includes an intermediate radial shoulder and the cover includes a further radial shoulder, and a second gasket located between said shoulders.

5. A sealing unit according to claim 1, wherein said pole includes an outwardly facing annular wall and the annular element includes an inwardly facing annular wall mechanically opposed to said pole and a gasket located between the annular walls.

6. A sealing unit according to claim 1, and wherein said ring nut includes an annular seat open in opposition against a lateral surface of said annular element and a gasket located in the annular seat.

7. A sealing unit according to claim 1, and wherein each said gasket comprises an "O" ring.

8. A sealing unit for electrolyte in electric batteries, said electric batteries including a container closed by a cover including an upstanding annular element formed with a planar upwardly facing annular surface circumscribing a hole formed in the cover for receiving a pole therethrough and forming an interspace therebetween, said sealing unit including a tubular ring nut secured in the interspace, at least a first sealing gasket cooperating with the ring nut, wherein said at least first sealing gasket is located between said pole, said cover and said ring nut forming three annular sealing surfaces for sealing the pole, the annular surface, and the ring nut respectively, and wherein said pole includes an intermediate radial shoulder and the cover includes a further radial shoulder, and a second gasket located between the shoulders.

9. A sealing unit according to claim 8, wherein said pole is formed with a lateral cylindrical surface, and said ring nut is formed with a beveled surface, said lateral cylindrical surface, said annular element and said bevel define a triangular annular opening for receiving the at least first gasket.

10. A sealing unit according to claim 8, wherein said ring nut includes an annular surface at an end for contacting the plane annular surface to thereby seal against blow-by of electrolyte.

11. A sealing unit according to claim 8, wherein said pole includes an outwardly facing annular wall and the annular element includes an inwardly facing annular wall mechanically opposed to said pole and said second gasket located between the annular walls.

12. A sealing unit for electrolyte in electric batteries, said electric batteries including a container closed by a cover including an upstanding annular element formed with a planar upwardly facing annular surface circumscribing a hole formed in the cover for receiving a pole therethrough and forming an interspace therebetween, said sealing unit including a tubular ring nut secured in the interspace, at least a first sealing gasket cooperating with the ring nut, wherein said at least first sealing gasket is located between said pole, said cover and said ring nut forming three annular sealing surfaces for sealing the pole, the annular surface, and the ring nut respectively, and wherein the ring nut includes an annular seat open in opposition against a lateral surface of said annular element and a gasket located in the annular seat.

13. A sealing unit according to claim 12, wherein said pole is formed with a lateral cylindrical surface, and said ring nut is formed with a beveled surface, said lateral cylindrical surface, said annular element and said bevel define a triangular annular opening for receiving the at least first gasket.

14. A sealing unit according to claim 12, wherein said ring nut includes an annular surface at an end for contacting the plane annular surface to thereby seal against blow-by of electrolyte.

15. A sealing unit according to claim 12, wherein said pole includes an outwardly facing annular wall and the annular element includes an inwardly facing annular wall mechanically opposed to said pole and a gasket located between the annular walls.

16. A sealing unit for electrolyte in electric batteries, said electric batteries including a container closed by a cover including an upstanding annular element formed with a planar upwardly facing annular surface circumscribing a hole formed in the cover for receiving a pole therethrough and forming an interspace therebetween, said sealing unit including a tubular ring nut secured in the interspace, at least a first sealing gasket cooperating with the ring nut, wherein said at least first sealing gasket is located between said pole, said cover and said ring nut forming three annular sealing surfaces for sealing the pole, the annular surface, and the ring nut respectively, and wherein each gasket comprises an "O" ring.

17. A sealing unit according to claim 16, wherein said pole is formed with a lateral cylindrical surface, and said ring nut is formed with a beveled surface, said annular surface, said lateral cylindrical surface and said bevel define a triangular annular opening for receiving the at least first gasket.

18. A sealing unit according to claim 16, wherein said ring nut includes an annular surface at an end for contacting the plane annular surface to thereby seal against blow-by of electrolyte.

19. A sealing unit according to claim 16, wherein said pole includes an outwardly facing annular wall and the annular element includes an inwardly facing annular wall mechanically opposed to said pole and a gasket located between the annular walls.

* * * * *